(12) United States Patent
Bubnick et al.

(10) Patent No.: US 9,506,351 B2
(45) Date of Patent: Nov. 29, 2016

(54) DURABLE TURBINE VANE

(71) Applicant: General Electric Company, Schenectady, NY (US)

(72) Inventors: Joseph Steven Bubnick, Cincinnati, OH (US); Robert Joseph Bartz, Cincinnati, OH (US); Daniel Edward Demers, Ipswich, MA (US); Robert Alan Frederick, West Chester, OH (US); Todd Stephen Heffron, Harrison, OH (US); Sean Michael Molleson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 854 days.

(21) Appl. No.: 13/852,358

(22) Filed: Mar. 28, 2013

(65) Prior Publication Data

US 2014/0321977 A1 Oct. 30, 2014

Related U.S. Application Data

(60) Provisional application No. 61/639,303, filed on Apr. 27, 2012, provisional application No. 61/790,885, filed on Mar. 15, 2013.

(51) Int. Cl.
| | |
|---|---|
| *F01D 5/14* | (2006.01) |
| *F01D 5/18* | (2006.01) |
| *F01D 9/02* | (2006.01) |

(52) U.S. Cl.
CPC .............. *F01D 5/186* (2013.01); *F01D 5/187* (2013.01); *F01D 9/02* (2013.01); *F05D 2240/303* (2013.01); *F05D 2260/202* (2013.01); *Y02T 50/673* (2013.01); *Y02T 50/676* (2013.01)

(58) Field of Classification Search
CPC .......... F01D 5/186; F01D 9/02; F01D 5/187; Y02T 50/673
USPC ....................................................... 415/115
See application file for complete search history.

(56) References Cited

U.S. PATENT DOCUMENTS

| | | | |
|---|---|---|---|
| 5,281,084 A * | 1/1994 | Noe ................... | F01D 5/186 415/115 |
| 6,273,682 B1 | 8/2001 | Lee | |

(Continued)

FOREIGN PATENT DOCUMENTS

| | | |
|---|---|---|
| CN | 85108282 A | 8/1986 |
| EP | 0182588 A1 | 5/1986 |

(Continued)

OTHER PUBLICATIONS

Unofficial English Translation of Chinese Office Action issued in connection with corresponding CN Application No. 201380022138.5 on May 7, 2015.

(Continued)

*Primary Examiner* — Jason Shanske
(74) *Attorney, Agent, or Firm* — General Electric Company; William Scott Andes (57) ABSTRACT

A durable nozzle vane includes a leading edge where hot combustion gas impinges on the vane, a pressure side extending from the leading edge to a trailing edge and a suction side extending from the leading edge to the trailing edge, a blunt region along the suction side between the leading edge and a high curvature region, the blunt region having small curvature in the length between the leading edge and the high curvature region allowing for at least two rows of cooling apertures.

13 Claims, 6 Drawing Sheets

(56) References Cited

U.S. PATENT DOCUMENTS

| | | |
|---|---|---|
| 6,554,562 B2 | 4/2003 | Dudebout et al. |
| 7,836,703 B2 | 11/2010 | Lee et al. |
| 7,878,761 B1 | 2/2011 | Liang |
| 7,984,607 B2 | 7/2011 | Sharma et al. |
| 7,997,866 B2 | 8/2011 | Naik et al. |
| 8,087,893 B1 | 1/2012 | Liang |
| 8,104,292 B2 | 1/2012 | Lee et al. |
| 8,317,473 B1 | 11/2012 | Liang |
| 2011/0164960 A1 | 7/2011 | Maldonado |

FOREIGN PATENT DOCUMENTS

| | | |
|---|---|---|
| EP | 0466501 A2 | 1/1992 |
| EP | 1061236 A2 | 12/2000 |
| EP | 1079071 A2 | 2/2001 |
| EP | 1108856 A2 | 6/2001 |
| EP | 1496203 A1 | 1/2005 |
| JP | 2000356104 A | 12/2000 |
| JP | 2008051107 A | 3/2008 |
| WO | 2009017015 A1 | 2/2009 |

OTHER PUBLICATIONS

Search Report and Written Opinion from corresponding PCT Application No. PCT/US2013/035490, dated Jun. 25, 2013.
Unofficial English Translation of Japanese Office Action issued in connection with corresponding JP Application No. 2015-508992 on Nov. 4, 2015.
CA office action issued on Sep. 27. 2016 in connection with corresponding CA Application 2870612.

* cited by examiner

DURABLE TURBINE VANE

CROSS REFERENCE TO RELATED APPLICATIONS

This application claims the benefit of U.S. Provisional Application No. 61/639,303, filed Apr. 27, 2012, and U.S. Provisional Application No. 61/790,885, filed Mar. 15, 2013, both of which are incorporated by reference in their entirety.

BACKGROUND

Present embodiments relate generally to apparatus, methods, and/or systems for improving durability of a nozzle segment for a turbine engine. More specifically, not by way of limitation, present embodiments relate to a more durable vane for a nozzle of a gas turbine engine having improved cooling capacity and allowing for higher temperature operation without negatively impacting aero-performance.

A gas turbine engine generally includes a compressor, a combustor and a turbine. The compressor and turbine generally include rows of airfoils that are stacked axially in stages. Each stage includes a row of circumferentially spaced stator vanes and a row of rotor blades which rotate about a center shaft or axis of the turbine engine.

In the turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly including a disk and a plurality of turbine blades. The high pressure turbine first receives the hot combustion gases from the combustor and includes a first stage stator nozzle that directs the combustion gases exiting from the combustor downstream through a row of high pressure turbine rotor blades extending radially outwardly from a first rotor disk. For embodiments including two or more turbine stages, each stage comprises a stator nozzle with a set of rotor blades. For example, not meant to be limiting, of a two stage turbine, a second stage stator nozzle is positioned downstream of the first stage blades followed in turn by a row of second stage turbine blades extending radially outwardly from a second rotor disk. The stator nozzles direct and aim the hot combustion gas in a manner to maximize extraction at the adjacent downstream turbine blades.

The first and second rotor disks are joined to the compressor by a corresponding rotor shaft for powering the compressor during operation. The turbine engine may include a number of stages of static airfoils, commonly referred to as vanes, interspaced in the engine axial direction between rotating airfoils commonly referred to as blades. A multi-stage low pressure turbine follows the two stage high pressure turbine and is typically joined by a second shaft to a fan disposed upstream from the compressor in a typical turbo fan aircraft engine configuration for powering an aircraft in flight.

As the combustion gasses flow downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

In the prior art, a known means for increasing performance of a turbine engine is to increase the operating temperature of the engine, which allows for hotter combustion gas and increased extraction of energy. Therefore, during operation and due to extreme temperatures of the combustion gas flow path and operating parameters, the stator blades may become highly stressed with extreme mechanical and thermal loading. However, until the creation of the present embodiments, the prior art has been unable to provide apparatuses, methods and systems that are as effective as the embodiments herein in reducing operational stress and/or temperatures placed on stator nozzle segments, including stator vanes, thereby allowing them to better withstand higher temperature operating conditions.

With respect again to embodiments herein, some engines include the stator nozzle assembly being, for example, an annular ring formed as a single piece. Other engines include the turbine stator nozzle assembly being formed as an annulus by a plurality of stator nozzle segments arranged in an annular array. The nozzle segments each include an inner band, an outer band and a vane extending therebetween. The vanes are hollow and receive a portion of pressurized air from the compressor which is used for cooling the vanes at all times during operation but especially during extremely high operating temperatures, specifically under certain conditions such as take-off or steep climbs. Additionally, compressed air may be released through surface apertures in the nozzle vane to form a thermal barrier of relatively cool air around the vane also called a cooling film.

In the past, an unmet need has been that, due to curvature near the leading edge of the vane, the compressed air apertures cannot be adequately provided to allow for even higher temperature operation. Additionally, due to vane curvatures in this area, the compressed air apertures cannot be created per intent successfully and thus the cooling film will not always adequately "attach" to the vane surface leaving the vane exposed to the high temperature combustion gas flow path.

As may be seen in this background section, there is a need for increasing durability of nozzle vanes which allow for increased operating temperatures and therefore increased turbine performance. It is further desirable to extend the useful service life of the nozzle. The present embodiments meet such needs and desires, and more.

SUMMARY

According to some aspects of the instant embodiments, a nozzle is taught having an improved arrangement of apertures for enhancing cooling of a nozzle vane.

According to some aspects of the instant embodiments, a nozzle is taught which has improved shape allowing for improved attachment of cooling film.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of these exemplary embodiments, and the manner of attaining them, will become more apparent and the nozzle feature will be better understood by reference to the following description of embodiments taken in conjunction with the accompanying drawings, wherein.

MULTIPLE EMBODIMENTS AND ALTERNATIVES

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

The present embodiments apply to a gas turbine engine, for example aviation, power generation, industrial or marine, in which a combustor burns fuel and discharges hot combustion gas into a high pressure turbine. The instant structures, methods and systems improve nozzle vane durability allowing higher operating temperatures without allowing permanent damage caused by thermal and mechanical loading.

With reference to FIGS. 1-6, and with respect to the many embodiments that are provided and which include those that are broadly tailored and others that are narrowly tailored, an illustrative set of exemplary nozzle embodiments have been selected in order provide details regarding nozzle vane contours that allow improved suction-side shaped hole manufacturability.

Figure 1:
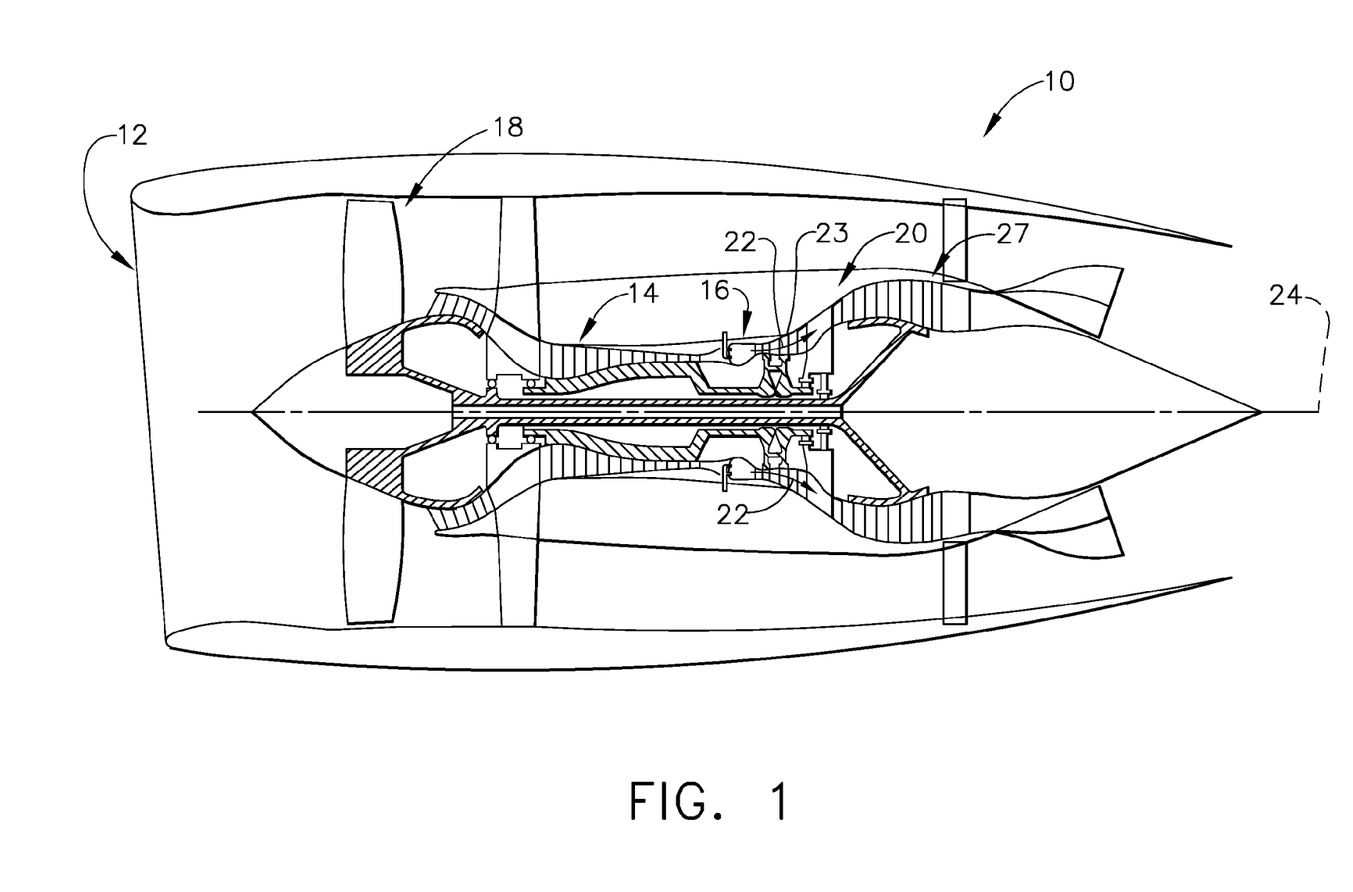
FIG. 1 is a schematic side section view of a gas turbine engine for an aircraft.

With specific reference to FIG. 1, a schematic side section view of a gas turbine engine 10 is shown having an engine inlet end 12 and a combustor 16. The gas turbine engine 10 further comprises selected components including but not limited to a fan 18, a compressor 14, and a multi-stage turbine 20. The multi-stage turbine 20 further comprises a high pressure turbine 23 and a low pressure turbine 27. The present embodiments involve an interface between the combustor 16 and the high pressure turbine 23. The gas turbine engine 10 may be used for aviation, power generation, industrial, marine or the like; however, the illustrative example shown is within a range of embodiments intended for aviation use. The gas turbine engine 10 further comprises one shaft 24, as illustrated, disposed axisymmetrically about the gas turbine engine 10 axis. Alternatively, gas turbine engines 10 may provide one or more shafts 24 disposed in a concentric fashion axisymmetrically about the engine axis. As desired, selected components are affixed to the shaft 24. The shaft is disposed within the gas turbine engine 10 in order to provide for rotation of the shaft 24 and any components affixed thereupon. For gas turbine engine 10 embodiments comprising one or more concentric shafts 24, for an example providing two or more shafts 24, each shaft may rotate at a different rotational velocity than any other shaft 24. Depending on the usage, the gas turbine engine inlet end 12 may alternatively provide compressors 14 that are multistage compressors, or the fan 18. In operation, air enters through the gas turbine engine inlet end 12 of the gas turbine engine 10 and moves through at least one stage of compressor 14 where the air pressure is increased and directed to the combustor 16. The compressed air is mixed with fuel within the combustor 16 and the resultant air-fuel mixture is caused to ignite and burn, thereby providing hot combustion gas 22 which exits the combustor 16 by passing through a combustor exit which directs the gas 22 toward the multi-stage turbine 20. With respect to gas 22 flowing downstream and afterward from the combustor 16, the hot gas 22 next encounters the high pressure turbine 23, wherein energy is extracted from the hot combustion gas 22 as it passes on through successive turbine stages, finally, as gas 22 temperature and pressure are reduced at each stage as work is extracted, through the low pressure turbine 27 and out of the engine 10 thereby causing rotation of the turbine 20 blades which, being affixed to the shaft 24, cause rotation of the shaft 24. Because the shaft 24 extends toward the front of the gas turbine engine 10 and has affixed to it components to include choices among the one or more compressor 14 stages, a turbo fan 18 or inlet fan blades, as desired depending on the design of gas turbine engine 10, more air is thereby drawn in through the inlet 12 as the cycle continues.

Figure 2:
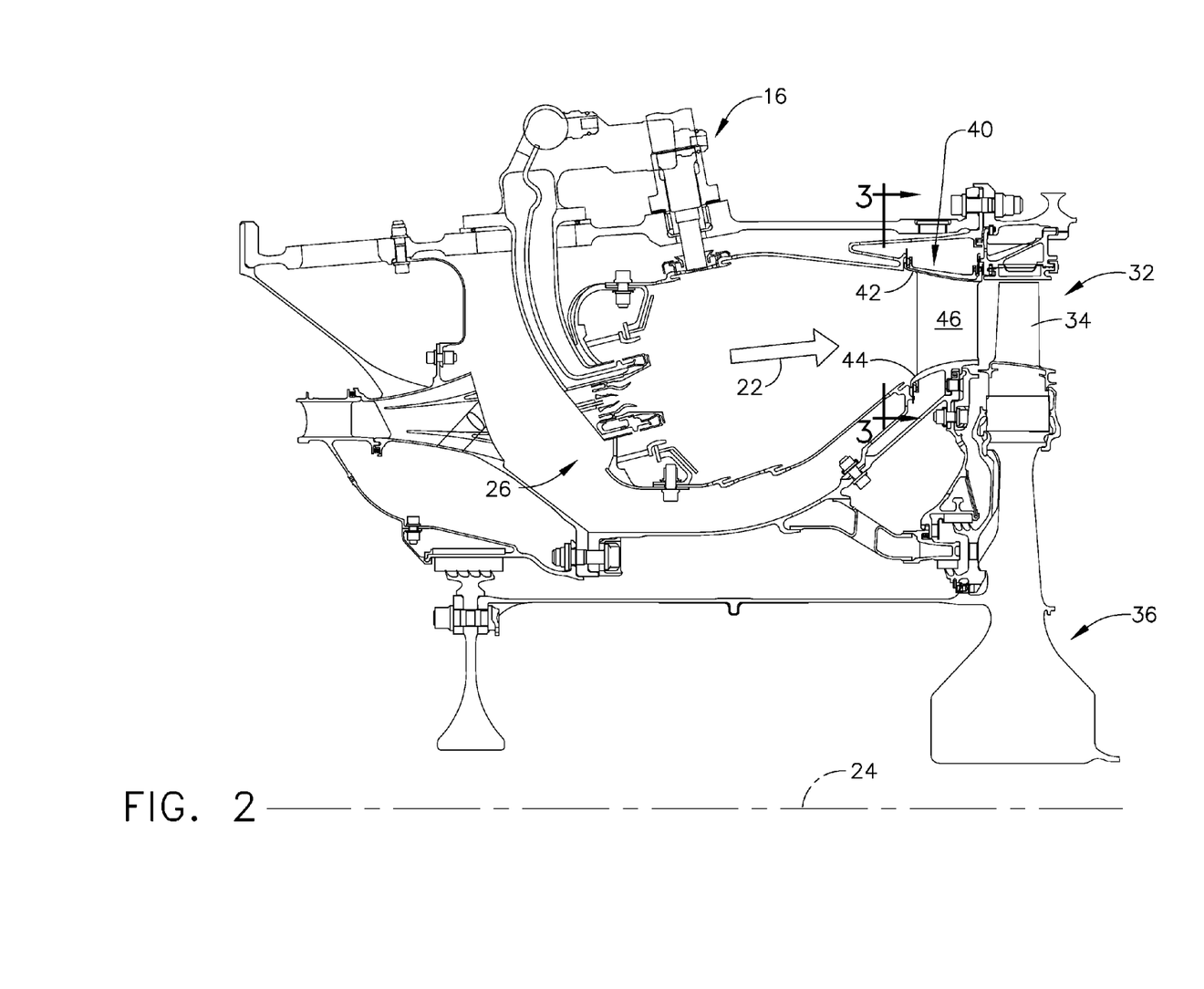
FIG. 2 is a schematic side view of a combustor and a hot exhaust gas passing through a first stage turbine nozzle and on through a rotor assembly.

With reference to FIG. 1, further details are illustrated for the present embodiments. With particular attention to an interface between the combustor 16 and the high pressure turbine (hereinafter, HPT) 23, the hot combustion gas 22 is shown by use of an arrow extending from and out of the combustor 16 and through the HPT 23 as part of the turbine 20. Referring now to FIG. 2, the region of the combustor 16 is shown in more detail. Hot combustion gas 22 is shown exiting the combustor 16 and flowing towards the stator nozzle 40 which, in some embodiments, comprises a plurality of nozzle segments 40, the nozzle further comprising one or more stator nozzle vanes 46, the hot gas 22 flowing on through the gas turbine engine 10 to the HPT 23.

With respect to further details regarding the turbine 20 (refer to FIG. 1), after hot gas 22 (refer now to FIG. 2) exits the stator nozzle 40, it encounters a rotor assembly 32. The rotor assembly 32 further comprises a disk 36 having one or more blades 34 disposed around the periphery of disk 36. A pair comprising one each of the stator nozzle 40 and the rotor assembly 32 defines a stage within the turbine 20 (refer again to FIG. 1), including but not limited to stages disposed within the high pressure turbine 23 and the low pressure turbine 27.

Figure 3:
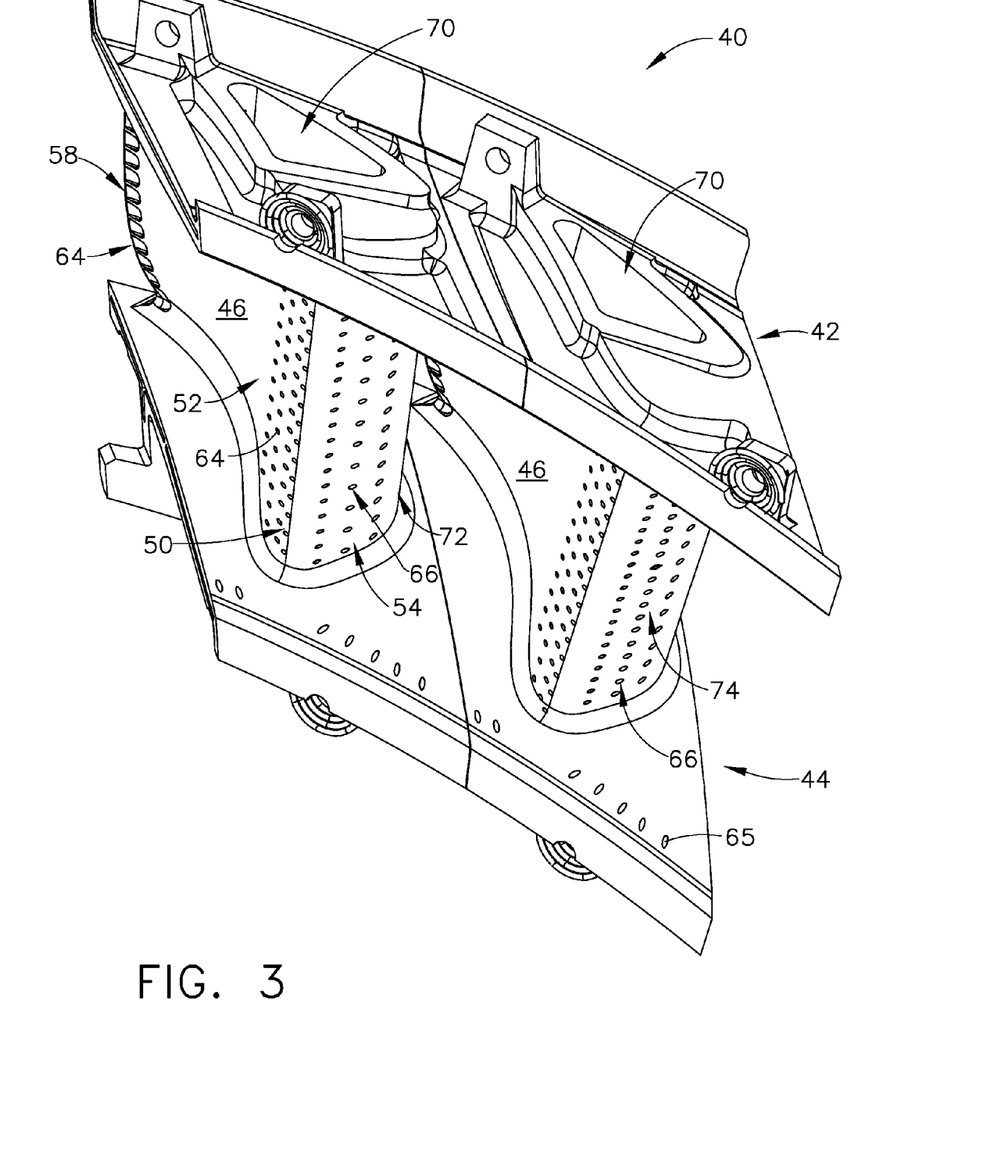
FIG. 3 is a perspective view of an exemplary nozzle vane segment.

For further details, refer again to the side view of FIG. 2 and also to the perspective view of FIG. 3 which illustrates a forward perspective view of the nozzle 40, looking aft. The illustrated example shows a fuel nozzle 26 disposed within the combustor 16. The nozzles or nozzle segments 40 are disposed opposite the combustor 16 in an annular array about the shaft 24 of the gas turbine engine 10. Each turbine stator nozzle 40 has an outer band 42, an inner band 44 and at least one vane 46 extending between the outer and inner bands 42, 44. In the exemplary embodiment, each nozzle or nozzle segment 40 comprises two vanes 46. The vanes 46 are shaped as airfoils with respect to the flow of fluid to include hot gas 22 past the vanes 46. The outer and inner bands 42, 44 are curved to form arcuate segments about the centerline or shaft 24 so that a plurality of nozzle segments 40 define an annular ring about the centerline or shaft 24 and within the engine 10. The vanes 46 extend generally in a radial direction and are curved to direct hot combustion gas 22 thereby maximizing work performed through energy extraction at the first stage turbine 20 blades 34 of the rotor assembly 32.

According to embodiments provided herein, the hot combustion gas 22 originates in the vicinity of one or more fuel nozzles 26 as a result of a mixture of fuel and air being burned in the combustor 16. As such, the flow of the hot gas 22 exiting the combustor 16 is aimed towards the vanes 46 as desired within a range of alignments selectable by a user. For example, embodiments comprise an alignment for hot gas 22 to exit the combustor 16 and flow towards a leading edge 50 of the nozzle vane 46. Alternatives comprise the hot gas 22 being aimed to pass in between two vanes 46. Other embodiments provide a plurality of alignments for the hot gas 22 to be between aimed anywhere from aimed directly at the vanes 46 to aimed to pass in between the vanes 46. Embodiments include those wherein selected disposition of fuel nozzles 26 within the combustor and/or selected geometry of the combustor exit combine as desired to achieve such aiming of the hot gas 22. Alternatives include those wherein each of the nozzle vanes 46 includes a plurality of cooling apertures 64, 66, 68 disposed thereupon which allow a film layer of cooling air to pass therealong thereby providing cooling to the vanes 46 as hot gas 22 also passes through the nozzle 40. As such embodiments provide that fluid flow through the nozzle 40 includes fluid selected from the group comprising hot gas 22 and cooling air. Alternative embodiments include those wherein additional cooling apertures 65 are disposed upon and within the inner and outer bands 44, 42. Cooling apertures 64, 65, 66, 68 serve to inhibit failure of the stationary stator nozzle 40 due to high-temperature and other stress effects placed on the nozzle 40 by the hot gas 22.

Figure 4:
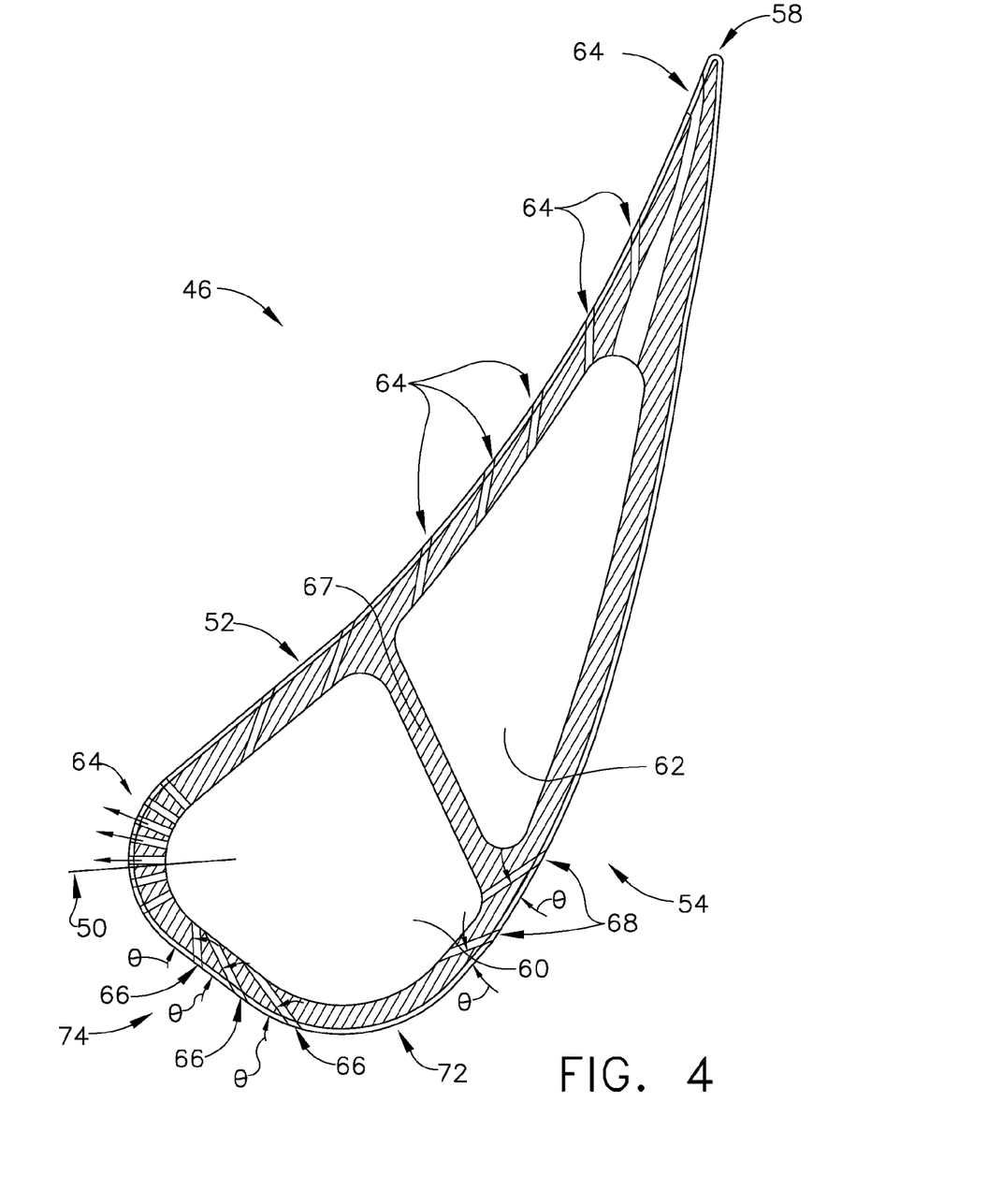
FIG. 4 is a cross-sectional chord-wise view of an airfoil associated with a nozzle.

For clarity and with reference to FIG. 4 for airfoils and to fluid flow thereabout, certain details are provided regarding selected features and aspects for airfoils associated with the nozzle vanes 46. The chord-wise view illustrated in FIG. 4 shows an exemplary embodiment of a nozzle vane 46 which comprises a leading edge 50 and a pressure side 52 extending from the leading edge 50 to the trailing edge 58. The vane 46 further comprises a suction side 54 extending from the leading edge 50 to the trailing edge 58. As seen in the chord-wise view of FIG. 4, the suction side is disposed laterally opposite the pressure side 52 as both sides 52, 54 extend from the leading edge 50 to the trailing edge 58 thereby defining a cross-sectional chord-wise airfoil shape for vane 46. The exemplary embodiment illustrated in FIG. 4, includes alternatives comprising the pressure side 52 being generally concave, and the suction side 54 being generally convex when viewed with respect to the chord-wise airfoil view of FIG. 4. The pressure side 52 includes a plurality of cooling apertures 64. The suction side 54 near the leading edge 50 includes a plurality of cooling apertures 66. There are at least two rows of apertures 66 to provide cooling to a blunter region 74 adjacent the leading edge 50.

With the flow of the hot gas 22 exiting the combustor 16 and aimed towards any specific vane 46, any portion of the hot combustion gas 22 that impinges upon a specific nozzle vane 46 will be mixed with cooling air passing through the nozzle 40 and outwardly through the apertures 64, 65, 66, 68 in that nozzle vane 46. In designing the vane 46, embodiments include those wherein cooling air is provided at the blunter region 74 of the suction side 54 between the leading edge 50 and a high curvature region 72. As such, embodiments include those wherein the shape of the nozzle 40 itself and the shape of the airfoil (as illustrated in perspective view of FIG. 3 and in cross section in FIG. 4) associated with the nozzle vane 46 is selected in order to create rows of film holes that lay down a nice, uniform film along the surface of the airfoil. Embodiments provide a layer of film cooling air in between the airfoil of vane 46 itself and the hot combustion gas 22. Although cooling of the HPT and with particular reference to nozzles 40, the stage 1 nozzle (S1N), is sought, it is also accepted that some amount of mixing of the cooling air with the hot combustion gas 22 will occur. Because this mixing inevitably happens, embodiments are distinguished over the past because a better quality of film is laid down to thus cool the nozzle airfoil while not inherently inhibiting cooling of downstream turbine airfoils, nozzles or blades. Alternative embodiments further maintain film attachment around the high curvature region 72 and along the suction side 54.

Referring now to FIG. 4, a section view along a chord of an exemplary nozzle vane 46 is shown. Each vane 46 includes a pressure side 52, and a suction side 54 extending from a leading edge 50. The pressure and suction sides 52, 54 extend to a trailing edge 58. Together the leading edge 50, pressure and suction sides 52, 54 and trailing edge 58 define an airfoil shape, receiving hot combustion gas 22 from the combustor 16 and directing the gas 22 to the rotor blade 34. Internally, the vane 46 includes a partition 67 extending between the pressure and suction sides 52, 54 and forming a leading cavity 60 and a trailing cavity 62. The partition 67 extends between pressure and suction sides on an angle so that the end of the partition 67 at the pressure side 52 is closer to the trailing edge 58 than the end of the partition 67 at the suction side 54.

With reference back to FIG. 3, the nozzle 40 includes a nozzle inlet 70 for each vane 46. The nozzle inlet 70 allows airflow into the trailing cavity 62 (shown in FIG. 4) which protects the interior of vane 46 and additionally allows cooling air flow to the outside of the vane 46. A separate nozzle inlet feeds leading cavity 60 from beneath the inner band 44 but is omitted from the view for clarity.

Also shown in FIG. 3, the vane 46 includes a plurality of apertures 64, 66 to allow cooling air to move from the interior of the vane 46 to the exterior surface of pressure side 52, the suction side 54 forward of the high curvature region 72, and the region of the leading edge 50 to provide cooling film along the surface of the vane 46. In the exemplary embodiment illustrated in FIG. 3, additional apertures 68 are disposed on the suction side 54 aft of the high curvature region 72. As such, in the example illustrated, the suction side 54 has apertures 66 and 68 disposed therealong. Additionally, the trailing edge 58 also includes cooling apertures 64. These apertures 64, 66, 68 establish a cooling film inhibiting damage to the vane 46 from the high temperature combustion gas 22 impinging the nozzle 40.

Figure 5:
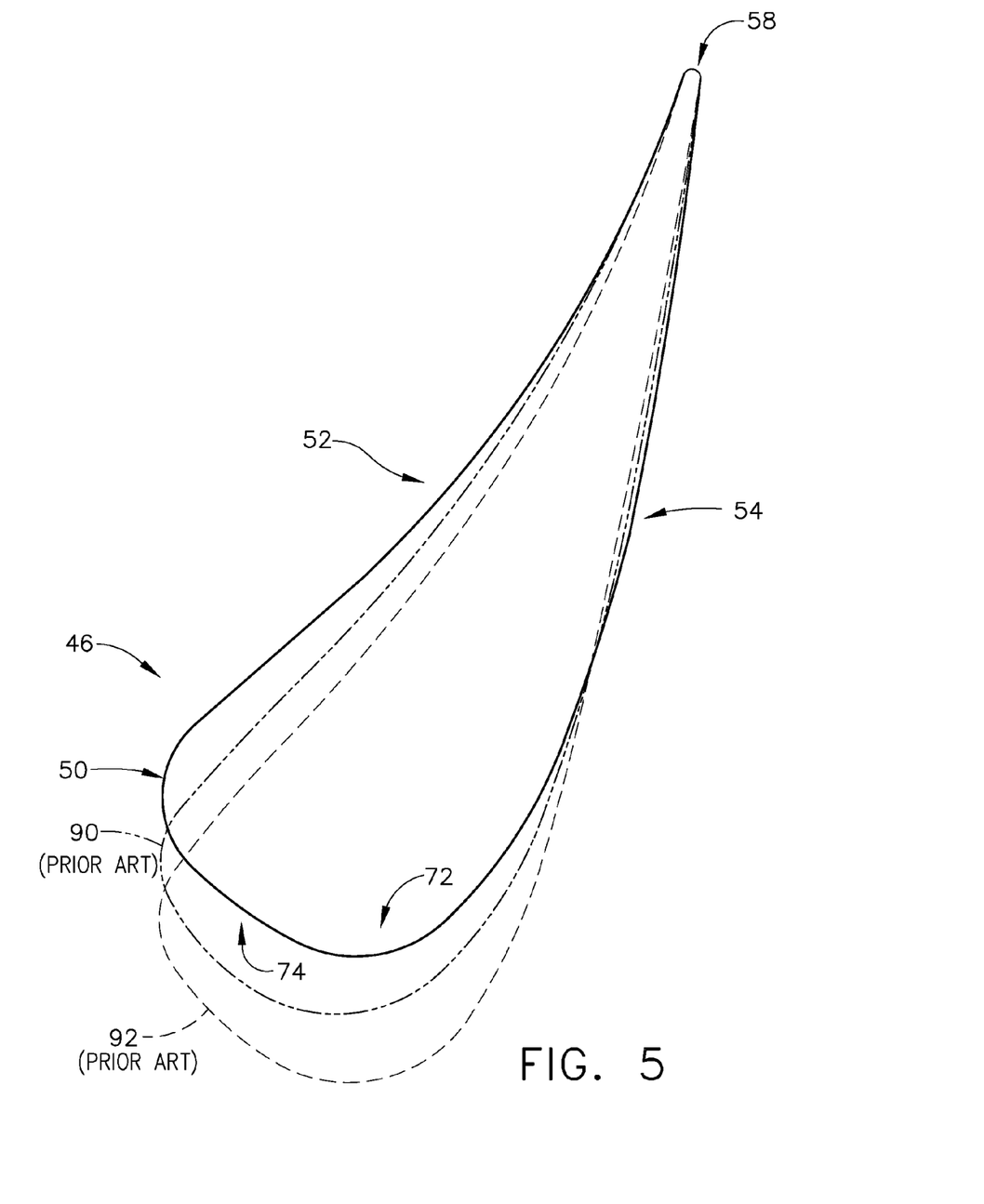
FIG. 5 is a pitchline airfoil comparison in non-dimensionalized coordinate space aligned at trailing edges.
Figure 6:
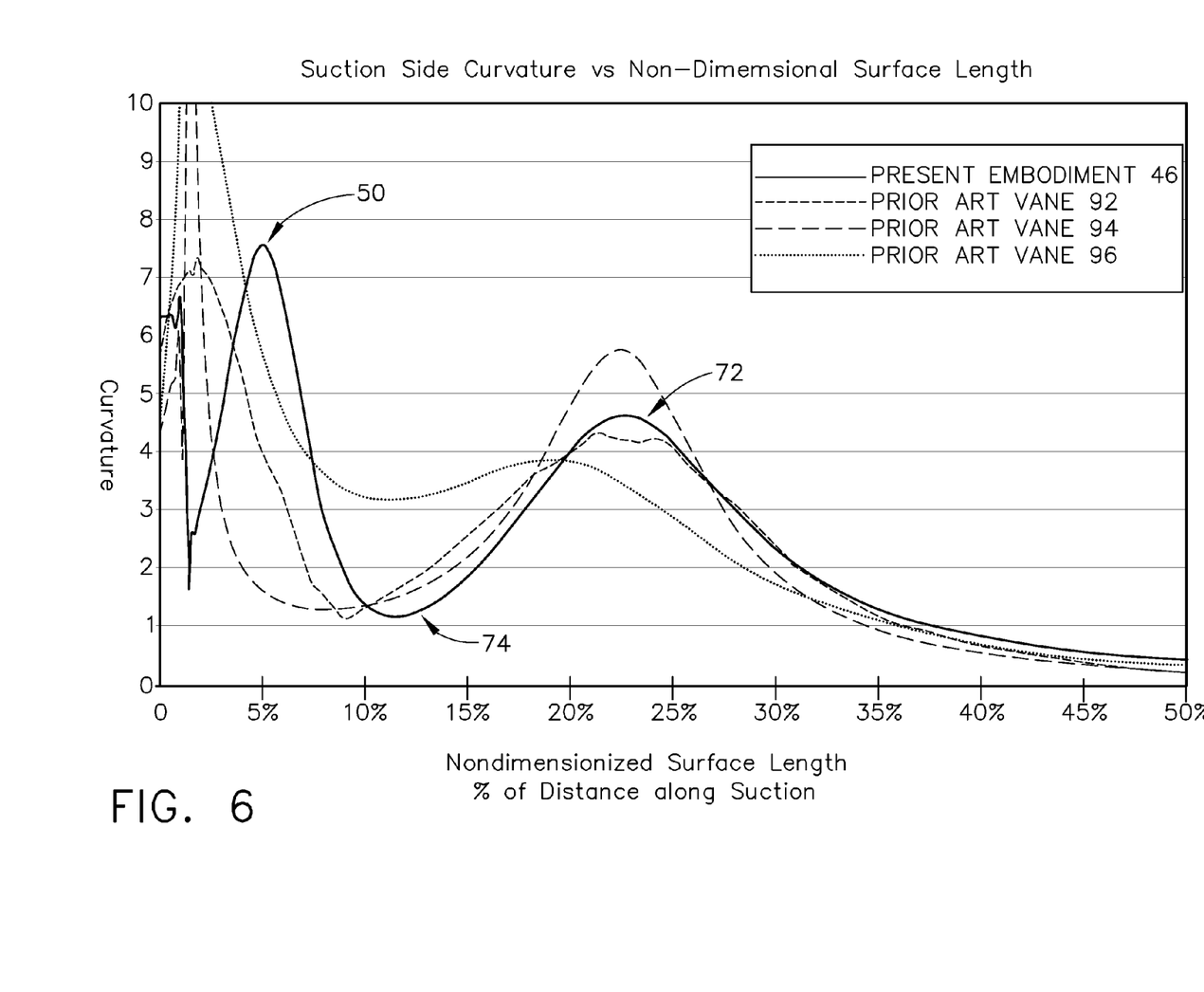
FIG. 6 is a plot comparison of various nozzle vane shapes shown as curvature versus non-dimensionalized surface length.

With reference to all the Figs. and in particular for comparisons to the prior art as provided in FIGS. 5 and 6, the vane 46 of the present embodiments provides at least three advantages over prior art vanes to include prior art vanes shown as 90, 92, 94 and 96 where illustrated:

First, the shape of the suction side 54 between the leading edge 50 and the high curvature region 72 is flattened, having reduced curvature, as compared to prior art airfoils—see FIG. 5. For clarity in description, not meant to be limiting, this shape will be termed a "blunter region" and assigned the reference numeral 74 hereinafter. The blunter region 74 allows for additional rows, and better geometry, of cooling apertures 66 and therefore allows improved cooling in this area and higher operating temperatures without heat or structural damage due to the heat. It was not until the present embodiments came into being that a desired quality, shape, quantity, or axial spacing was possible for apertures 66 disposed along the forward portions of the surface of the suction side 54.

Second, because the leading edge 50 is blunter than prior art designs, the heat load is distributed over a larger area and cold side surface area is closer to gas side surface area in regions where gas temperatures normally cause thermal problems in vanes 46 due to inadequate local film cooling effectiveness.

Third, due to its flatter and lower curvature over prior art designs and the mild transition to the high curvature region 72, the blunter region 74 enables the film from associated cooling apertures 66 to maintain attachment around the high curvature region 72. The blunter region 74 and selected wall thickness allows for a selected quality for a film hole that diffuses the film and allows for a shallow angle to the airfoil surface thereby further assisting in adhesion of the film to the airfoil downstream.

Prior art vanes, did not meet a need to allow for cooling aperture drilling. Therefore, high curvature areas of prior designs defined a potentially weakened area structurally due to inadequate cooling of the vane. Embodiments meet the need for adequate cooling in that, the blunter region 74 apertures 66 and apertures 68 aft of the high curvature region 72, being where curvature is increased, still allows for appropriate cooling. However, the apertures 66, 68 allow for improved cooling in this area of the vane 46 and the selected blunt shape of the blunter region 74 allows for drilling of the apertures 66 at appropriate angles as selected by the user. The required curvature aft of the high curvature region 72 also enables a disposition, as desired, of multiple rows of cooling apertures 68.

The reduced curvature of the blunter region 74 adjacent the leading edge allows for manufacturing of the apertures 66 at desired angles. Embodiments comprise those wherein the apertures 66, 68 are formed, for example not meant to be limiting, by drilling, on the vane 46 at an angle θ, wherein θ is desirably within a range of from about zero to about 40 degrees with respect to the surface of the vane 46. Accordingly, the temperature in the blunter region 74 and the high curvature region 72 is controlled to tolerable levels, inhibiting damage.

In addition, curvature in the high curvature region of some prior art vanes is known to have caused undesirable detachment of cooling film from such vanes. However, in contrast to prior art designs, embodiments having the depressed curvature of high curvature region 72 provide improved adherence of the cooling film to the vane 46 thereby providing improved cooling in the high curvature region 72 and downstream therefrom.

Referring again to details illustrated in FIG. 5, a pitchline airfoil comparison in non-dimensionalized coordinate space is shown wherein all airfoils are aligned at their respective trailing edges. As depicted, the pressure side 52 extends from the leading edge 50 to the trailing edge 58. The suction side 54 extends from the leading edge 50 to the trailing edge 58. The suction side 54 includes the blunter region 74 between the high curvature region 72 and the leading edge 50. Vane 46 is shown in solid line aligned at trailing edges with two prior art vanes 90, 92, shown in broken line patterns. The blunt region 74 between leading edge 50 and high curvature region 72 is flatter than illustrated with reference to the prior art vanes 90, 92. Additionally, the blunter region 74 has a greater length of less curvature than in prior art vanes. Accordingly, the blunter region 74 of the vane 46 allows for positioning of rows of cooling apertures 66 in this area at appropriate angles to provide a better thermal barrier for the vane 46.

Referring now to FIG. 6, a plot of the suction side curvature relative to a non-dimensionalized surface length is shown as compared to multiple prior art vane designs. The horizontal axis depicts a percentage of the length of the suction side from the leading edge near the 0 mark to about 50% of the length of the suction side 54. The vane 46 is shown in solid line as opposed to the prior art vanes which are depicted in broken line patterns. Additionally, the high curvature region 72 and the blunter region 74 are illustrated with respect to the exemplary embodiment shown in FIGS. 5 and 6.

The plot of FIG. 6 generally indicates regions of the curvature for ease of understanding the graph. Because curvature is inversely related to radius, the lower the plot lines relative to the vertical axis, the flatter the surface of the vane suction side. For example, the lower region of the lines generally in the area of between about 8% and 17% is the blunter region 74 of the suction side 54. Similarly, the higher region of the lines generally in the area of between about 20% and 25% along the length of the suction side 54 corresponds to the high curvature area 72.

The plot of suction side curvature versus non-dimensionalized surface length depicts two favorable features of the instant embodiments of vanes 46 as compared to the prior art vanes such as the illustrated prior art vanes 92, 94 and 96:

First, the region of the suction side 54 between the leading edge 50 and the high curvature region 72 has a flatter profile than the similar regions of the prior art vanes 92, 96. The flatter profile is provided by a larger radius in the region between the leading edge 50 and the high curvature region 72. This allows, as previously mentioned, that cooling apertures 66 may be formed in this region for improved cooling of the vane 46.

Second, the profile depicts that the blunter region 74 of vane 46 between the leading edge 50 and the high curvature region 72 has a longer flattened distance than prior art vanes 92, 96 in conjunction with a larger radiused leading edge 50. As a result of these characteristics, the film of cooling air will maintain aerodynamic attachment to the surface of the vane 46 suction side in this region better than in prior art vanes 92, 96 because of the larger radius in this region. This provides improved cooling in the high curvature region 72 of the vane 46 because the cooling film does not readily detach as problematically occurs with prior art vanes such as 94 which are designed having a smaller radius in their region of high curvature. To be clear, embodiments of the durable vane 46 provide an optimized combination of geometry for the blunter region 74 and the high curvature region 72 thereby enabling embodiments of vane 46 to perform their aerodynamic function while also remaining durable in their operating environment.

Additionally, while only one vane 46 example of many embodiments is illustrated in order to maintain clarity in the view, despite the smaller curvature of the blunter region 74, the curvature of the high curvature region 72 is flatter than various other prior art vanes such as 94. This encourages film attachment in the area of the high curvature region 72 and provides improved cooling in this area of the vane 46.

With clear distinction over the prior art designs briefly, and in specific:

Prior art first vane 96 does not have the "flattened area" of the blunter region 74 as depicted by the local minimum of surface curvature near the 11-12% nondimensional surface length. Because of the lack of this minimum surface curvature, additional rows of apertures of specific shape cannot be drilled successfully as compared to the successful and optimized disposition of apertures disposed on vane 46. Due to the lack of what in the present embodiments is the flattened area 74, prior art designs did not need a region of locally higher curvature around the 20-25% surface length area as more turning of the hot combustion gas flow and cooling film along the suction side 54 of the airfoil occurred further upstream of this region. In contrast, the present embodiments provide this flattened area 74 as they meet the increased cooling demands associated with a higher temperature of hot gas 22 as found in the current state of the art, those demands only capable of being met by the present embodiments and alternatives.

Prior art vane 94 is clearly much flatter, having less curvature, than with respect to the blunter region 74 of vane 46. Furthermore, and in an opposite manner to that of the vane 46, prior art vane 94 has a very broad region of low curvature, apparently to enable such drilling as may be possible for their cooling holes. However, the prior art vane's 94 significant lack of curvature upstream in their nozzle then necessitates significantly more curvature downstream along their nozzle to obtain the necessary turning of the main gas flow. As a result, the prior art vane 94 has to accept a higher amplitude high-curvature point near 23% surface length, which is not as desirable and results in poor cooling film attachment in the high curvature region 72.

Embodiments of vane 46 are still more blunt at the blunter region 74 between the leading edge 50 and the high curvature region 72 relative to the prior art vane 92. The blunter region 74 of vane 46 is also further downstream and has a broader flattened length as shown in that the curvature plot from ~8% to ~17% surface length is broader than the shallow curvature of the vane 92. Additionally, the curvature plot reflects that the leading edge curvature is much higher for prior vanes 94 and 96 than that illustrated for the curvature of leading edge 50 of exemplary embodiment vane 46. Therefore, the leading edge radii of prior art vanes 94 and 96 are much smaller resulting in greater difficulties in cooling for such prior art vanes.

According to some embodiments, a durable turbine nozzle vane 46 comprises a leading edge 50 where hot combustion gas 22 impinges on the vane 46, a pressure side 52 extending from the leading edge to a trailing edge 58 having a concave surface and a suction side 54 extending from the leading edge 50 toward the trailing edge 58 having a convex surface, a blunter region 74 along the suction side 54 between the leading edge 50 and a high curvature region 72, the blunter region 74 having small curvature in the length between the leading edge 50 and a high curvature point disposed along the high curvature region 72. The blunter region 74 further comprises at least two rows of cooling apertures 66. Embodiments comprise those wherein the apertures 66 are formed, for example not meant to be limiting, by drilling, on the vane 46 at an angle θ, wherein θ is desirably within a range of from about zero to about 40 degrees with respect to the surface of the vane 46. The blunt region has the small curvature in the range of about 8% of the suction side 54 length to about the 17% of the suction side 54 length. Curvature as described herein has units that are an inverse of radius as a distance, or 1/radius. Embodiments include those wherein the radius is measured in inches. An exemplary embodiment provides that the small curvature of the blunter region 74 has a minimum value of curvature wherein 1/radius is approximately 1.25.

According to other embodiments, a durable turbine vane 46 comprises a pressure side 52 and a laterally opposite suction side 54 wherein the pressure side 52 is generally concave and the suction side 54 is generally convex, a trailing edge 58 defined at one location where the suction side 54 and the pressure side 52 join, a leading edge 50 at a second location where the suction side 54 and the pressure side 52 join, the suction side 54 having a blunter region 74 and a high curvature region 72, the blunter region 74 disposed between the leading edge 50 and the high curvature region 72, the blunter region 74 has minimal curvature over a longer non-dimensionalized length of between about 8% and about 17% of suction side 54 surface length. The durable vane 46 further comprises a plurality of rows of cooling apertures 66 in the blunter region 74.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A durable gas turbine vane, comprising:
   an inner band, an outer band, and at least one vane extending between the inner and outer bands;
   the at least one vane further comprising a leading edge, a trailing edge, a suction side and a pressure side;
   the suction side being disposed laterally opposite the pressure side;
   wherein the suction side and the pressure side extend between the leading edge to the trailing edge thereby defining a chord-wise airfoil shape for the at least one vane;
   the at least one vane being curved along an axial direction;
   the suction side including a blunter region and a high curvature region;
   the high curvature region spaced from said blunter region;
   the blunter region having at least two rows of linear cooling apertures;
   the cooling apertures being formed upon and extending into a surface of the blunter region; and,
   the apertures extending at an angle θ, wherein θ is within a range of from zero to 40 degrees with respect to the surface of the blunter region.

2. The durable gas turbine vane of claim 1, the blunter region being flatter than the high curvature region and being located between the leading edge and the high curvature region.

3. The durable gas turbine vane of claim 2, said blunter region having a flattened distance of reduced curvature.

4. The durable gas turbine vane of claim 1, said blunter region including three rows of said cooling apertures.

5. The durable gas turbine vane of claim 1, said blunter region being between 8% and 17% of the surface length of said suction side.

6. The durable gas turbine vane of claim 1, said blunter region having a minimum nondimensional curvature of 1/radius being 1.25.

7. The durable gas turbine vane of claim 6, the blunter region between the leading edge and the high curvature region having a flattened distance in conjunction with a radiused high curvature region leading edge, thereby enhancing cooling air film attachment to the vane suction side.

8. A durable turbine nozzle vane, wherein the vane comprises:
   a leading edge where hot combustion gas impinges on the nozzle vane;
   a pressure side having a concave surface extending between the leading edge to a trailing edge;
   a suction side having a convex surface extending between the leading edge to the trailing edge;
   the suction side being disposed laterally opposite the pressure side;
   the suction side and the pressure side extend between the leading edge to the trailing edge thereby defining a chord-wise airfoil shape for the vane;
   a blunter region disposed along the suction side between the leading edge and a high curvature region having at least two rows of linear cooling apertures; and,
   the blunter region having a curvature in the length between the leading edge and the high curvature region.

9. The durable gas turbine vane of claim 8, the blunter region further comprising at least one row of cooling apertures.

10. The durable gas turbine vane of claim 9 wherein the cooling apertures are formed upon and extending into a surface of the blunter region and the apertures extend at an angle θ, wherein θ is within a range of from zero to 40 degrees with respect to the surface of the blunter region.

11. The durable gas turbine vane of claim 10, the blunter region having a in the range of 8% of the suction side length to 17% of the suction side length.

12. The durable gas turbine vane of claim 11 wherein the minimum nondimensional curvature of the blunter region is less than 1.25.

13. The durable gas turbine vane of claim 12, the blunter region between the leading edge and the high curvature region having a flattened distance in conjunction with a radiused high curvature region leading edge, thereby enhancing cooling air film attachment to the vane suction side.

* * * * *

UNITED STATES PATENT AND TRADEMARK OFFICE
CERTIFICATE OF CORRECTION

PATENT NO.         : 9,506,351 B2                                            Page 1 of 1
APPLICATION NO.    : 13/852358
DATED              : November 29, 2016
INVENTOR(S)        : Bubnick et al.

It is certified that error appears in the above-identified patent and that said Letters Patent is hereby corrected as shown below:

In the Specification

In Column 4, Line 31, delete "inlet 12" and insert -- inlet end 12 --, therefor.

In the Claims

In Column 12, Line 30, in Claim 9, delete "durable gas turbine vane" and insert -- durable turbine nozzle vane --, therefor.

In Column 12, Line 33, in Claim 10, delete "durable gas turbine vane" and insert -- durable turbine nozzle vane --, therefor.

In Column 12, Line 38, in Claim 11, delete "durable gas turbine vane" and insert -- durable turbine nozzle vane --, therefor.

In Column 12, Line 39, in Claim 11, delete "having a" and insert -- having a curvature --, therefor.

In Column 12, Line 41, in Claim 12, delete "durable gas turbine vane" and insert -- durable turbine nozzle vane --, therefor.

In Column 12, Line 44, in Claim 13, delete "durable gas turbine vane" and insert -- durable turbine nozzle vane --, therefor.

Signed and Sealed this
Twenty-third Day of May, 2017

Michelle K. Lee
*Director of the United States Patent and Trademark Office*